(12) United States Patent
Kerr

(10) Patent No.: US 12,419,299 B2
(45) Date of Patent: Sep. 23, 2025

(54) RODENT SNAP TRAP WITH STICKY AREA OUTSIDE KILL ZONE

(71) Applicant: Dylan Michael Kerr, Genoa, NV (US)

(72) Inventor: Dylan Michael Kerr, Genoa, NV (US)

( * ) Notice: Subject to any disclaimer, the term of this patent is extended or adjusted under 35 U.S.C. 154(b) by 0 days.

(21) Appl. No.: 18/428,184

(22) Filed: Jan. 31, 2024

(65) Prior Publication Data

US 2025/0241289 A1    Jul. 31, 2025

(51) Int. Cl.
*A01M 23/00* (2006.01)
*A01M 23/30* (2006.01)

(52) U.S. Cl.
CPC .......... *A01M 23/005* (2013.01); *A01M 23/30* (2013.01)

(58) Field of Classification Search
CPC ...... A01M 23/00; A01M 23/24; A01M 23/30; A01M 23/245; A01M 23/005; A01M 23/32; A01M 23/34; A01M 23/36; A01M 23/38; A01M 23/26; A01M 23/265; A01M 23/28
USPC .......... 43/58, 81, 81.5, 82, 83, 83.5, 96, 114
See application file for complete search history.

(56) References Cited

U.S. PATENT DOCUMENTS

| | | | | |
|---|---|---|---|---|
| 1,830,261 A * | 11/1931 | Bunker | ................. | A01M 23/30 43/81 |
| 1,919,527 A * | 7/1933 | Orr | ....................... | A01M 23/30 43/83 |
| 1,995,344 A * | 3/1935 | Gebhard | ............... | A01M 23/30 43/81 |
| 2,052,345 A * | 8/1936 | Garling | ................ | A01M 23/30 43/81 |
| 2,059,119 A * | 10/1936 | Korbisser | ............. | A01M 23/30 43/83.5 |
| 2,362,031 A * | 11/1944 | Smith | .................... | A01M 23/30 43/81 |
| 2,741,064 A * | 4/1956 | Patch | ..................... | A01M 23/30 43/81 |
| 2,761,240 A | 9/1956 | Lehn | | |
| 3,769,742 A * | 11/1973 | Spain | .................... | A01M 23/30 43/81 |
| 4,161,079 A * | 7/1979 | Hill | ...................... | A01M 23/005 43/131 |

(Continued)

FOREIGN PATENT DOCUMENTS

| | | | | |
|---|---|---|---|---|
| CN | 111280157 A | * | 6/2020 | .......... A01M 23/005 |
| WO | WO-2015001299 A1 | * | 1/2015 | ............ A01M 1/103 |

OTHER PUBLICATIONS

Victor snap mouse trap; screenshot taken from Amazon.com on Jan. 31, 2024.

(Continued)

*Primary Examiner* — Katelyn T Truong
(74) *Attorney, Agent, or Firm* — Etherton Law Group, LLC

(57) ABSTRACT

A sticky area is strategically located on a snap trap which allows for a rodent to get stuck at the right distance from the bait for the rodent's wriggling to trigger the hammer bar to snap down and kill it instantly. The hammer bar has a first arm, a cross bar, a second arm and a pivot arm which define a kill zone on an attached base when the trap is in its unarmed state. A bait pedal is in the kill zone. The pivot arm is disposed in a coil spring, and a hold-down bar biases the spring and hammer bar in the armed position. A sticky area is disposed outside the kill zone and on at least three sides of the kill zone. The sticky area is on the surface of the base or on a sheet below the top surface of the base.

16 Claims, 8 Drawing Sheets

(56) References Cited

U.S. PATENT DOCUMENTS

| | | | | |
|---|---|---|---|---|
| 5,488,800 | A * | 2/1996 | O'Hara | A01M 23/30 |
| | | | | 43/81 |
| 6,266,917 | B1 * | 7/2001 | Hight | A01M 1/2011 |
| | | | | 43/131 |
| 7,757,429 | B1 * | 7/2010 | Cambio | A01M 23/30 |
| | | | | 43/81 |
| 9,737,069 | B1 * | 8/2017 | Giles, Jr. | A01M 23/245 |
| 11,445,719 | B1 * | 9/2022 | McGrade | A01M 23/30 |
| 2010/0199544 | A1 * | 8/2010 | Frisch | A01M 23/30 |
| | | | | 43/81 |
| 2013/0118054 | A1 * | 5/2013 | Robinson | A01M 23/005 |
| | | | | 43/124 |
| 2013/0283671 | A1 * | 10/2013 | Czokajlo | A01M 1/026 |
| | | | | 43/113 |
| 2016/0360742 | A1 * | 12/2016 | Nelson | A01M 23/245 |
| 2019/0183107 | A1 * | 6/2019 | Edevold | A01M 23/08 |
| 2020/0120919 | A1 * | 4/2020 | Dolshun | A01M 23/005 |
| 2020/0315156 | A1 * | 10/2020 | Giacia | A01M 23/16 |
| 2020/0390082 | A1 * | 12/2020 | Waiker | F16M 13/027 |
| 2022/0183264 | A1 * | 6/2022 | Rose | A01M 23/005 |
| 2022/0408716 | A1 * | 12/2022 | McGrade | A01M 23/30 |
| 2023/0200371 | A1 * | 6/2023 | Nardelli | A01M 23/30 |
| | | | | 43/81 |

OTHER PUBLICATIONS

Jawz snap mouse trap; screenshot taken from Amazon.com on Jan. 31, 2024.

* cited by examiner

RODENT SNAP TRAP WITH STICKY AREA OUTSIDE KILL ZONE

FIELD OF INVENTION

This invention relates generally to rodent traps. This invention relates more particularly to a rodent snap trap with a sticky area in which the size, shape and location of the sticky area detains the rodent at the right distance from the bait to be killed when the trap snaps.

BACKGROUND

Rodent snap traps employ a spring-loaded trigger which trips a hammer bar when the trigger is jostled. Bait is put on the trigger and when the rodent tries to eat the bait the trigger is jostled, causing the hammer bar to snap down on the bait area. If the rodent is in the bait area it is killed instantly by the hammer bar when it hits the rodent's head or neck. Rodents are agile and crafty though, so they often steal the bait without triggering the hammer bar, escaping the still-armed snap trap alive and well and ready to continue the infestation.

Another problem with rodent snap traps is that arming the trap can be difficult. The hammer bar is often a wire of relatively small diameter. When the trap is in its unarmed state, the hammer bar rests on or very close to the base, which makes it difficult to grasp the narrow wire using finger tips, so often a fingernail is inserted under the wire to start lifting the hammer bar. Many people have fingernails that are too long or too short to easily lift the hammer bar off the base. It would be advantageous to be able to lift the hammer bar off the base more easily.

Another common rodent trap is the glue trap. Glue traps are sheets of cardboard or wood that have a sticky surface that are placed where rodents walk. Whenever a rodent tries to cross the glue its feet will get stuck and in theory be unable to free itself, leading to its eventual death. Unfortunately, because death is not instantaneous, a rodent may free itself from the glue trap before dying, by wriggling or chewing off the foot that is stuck to the glue. If a rodent can't extricate itself from the glue trap, it often dies a miserable death with prolonged suffering due to starvation or dehydration. It would be preferable to minimize suffering when killing a rodent.

Snap traps with sticky surfaces are known, but because the sticky surface is in the kill zone, the rodent can stand outside the trap on non-sticky surface and reach the bait with its mouth or tongue without stepping on or touching a sticky area. Again, the rodent steals the bait and stays alive.

It would be advantageous to use a sticky surface like that of a glue trap to detain a rodent near the bait in a way that it cannot reach the bait without stepping on a sticky surface, so that its wriggling will trigger the hammer bar to strike the rodent and kill it before it steals the bait.

SUMMARY OF THE INVENTION

A free-moving rodent often eats all of the bait and does not trigger the trap. This rodent trap configures a sticky area strategically on a snap trap outside the kill zone, which causes a rodent to get stuck outside the kill zone in a location that still allows it to access the bait area to trigger the trap while the rodent is stuck.

The trap has a hammer bar attached to a base. The hammer bar has a first arm, a cross bar, a second arm and a pivot arm define the kill zone on the base when the trap is in its unarmed state. A bait pedal is in the kill zone. The pivot armarm is disposed inside the core of a coil spring, and a hold-down bar biases the spring and hammer bar in its armed position.

A sticky area is disposed outside the kill zone and on at least three sides of the kill zone. In one embodiment the base is at least twice the width of the kill zone and the sticky area is disposed on the surface of the base. In another embodiment, the width of the base is the same or only slightly larger than the kill zone and a sheet having a sticky face is attached to the bottom surface of the base so that the sticky area surrounds the base on at least three sides.

As a rodent approaches the armed trap it steps onto the sticky area outside the kill zone but close enough to it for the rodent to reach with its head and mouth to the bait. With its feet stuck outside the kill zone and its head in the kill zone, the bait trigger is jostled and releases the hammer bar, killing the rodent instantly.

To make it easier to lift the hammer bar to arm the device, an optional lift lever may be pivotally attached to the pivot arm or base. Optionally a riser may be positioned below the hammer bar in the trap's unarmed state to raise the hammer bar off the surface of the base making it easier to grab the hammer bar.

DETAILED DESCRIPTION OF THE INVENTION

Figures 15, 16:
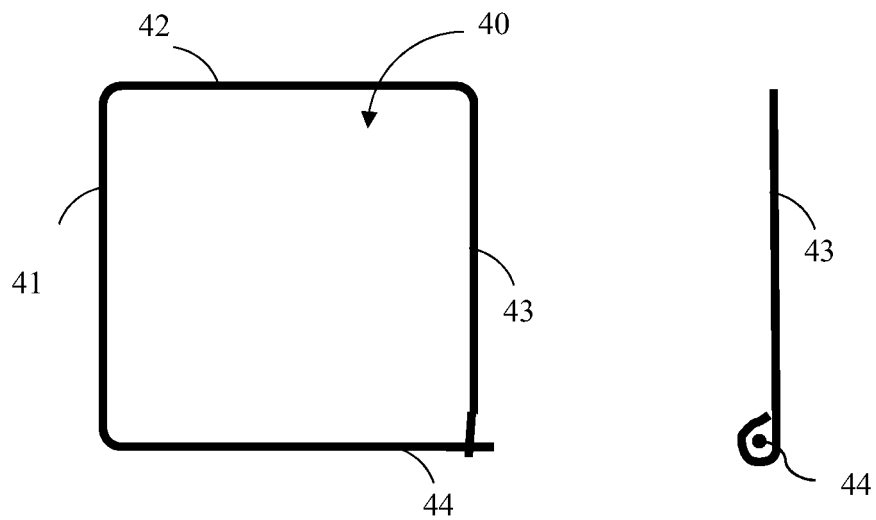
FIG. 15 is a top view of the hammer bar defining the kill zone.
FIG. 16 is a side view of FIG. 15.

FIGS. 1-14 and 19 show a rodent snap trap having a base 11. The base 11 is typically made of wood or other material with a non-sticky surface, but may be formed from plastic, metal, and other materials. A hammer bar 12 has a first arm 41, a cross bar 42, a second arm 43 and a pivot arm 44, all connected to form a perimeter defining a kill zone 40 on the base. See FIG. 15. The hammer bar 12 is attached to the base typically by staples at each end of the pivot arm 44. The pivot arm 44 is disposed inside the core of a coiled spring 15. A hold-down bar 14 is attached the base 11 at only one end, leaving the unsecured end free to move. A bait pedal 17 is loosely attached to the base 11 within the kill zone 40 so that jostling it or the base moves it out of position.

The trap has an unarmed and armed state. In the unarmed state, the hammer bar 12 rests on the base 11 surrounding the bait pedal 17. The area inside the hammer bar 12 when the trap is in its unarmed state is the kill zone 40. In the trap's armed state, the hammer bar is rotated about the spring 15 until one end 26 of the spring is pressed against the base 11. The hold-down bar 14 is positioned over the spring 15 and its unsecured end is set in a latch 16 on the bait pedal 17, thereby biasing the spring 15 and hammer bar 12 in the armed position. If the bait pedal 17 is jostled, the unsecured end of the hold-down bar 14 falls out of the latch 16 and the spring 15 recoils, snap rotating the hammer bar 12 back to the unarmed state.

A sticky area 20 is disposed outside the kill zone 40 and preferably on at least three sides of the kill zone, and the sticky area may surround the trap on all sides. The sticky area 20 may be disposed directly on the trap or on cardboard or other substrate which in turn is affixed to the top of the base 11. The sticky area 20 is made sticky with an adhesive, such as glue, tape, cement, mucilage, paste or other material. The adhesive may be sprayed, painted, rolled or calendared onto the sticky area. Any type of adhesive or method of application can be used that results in being sticky enough to hold a rodent where it steps.

Figure 2:
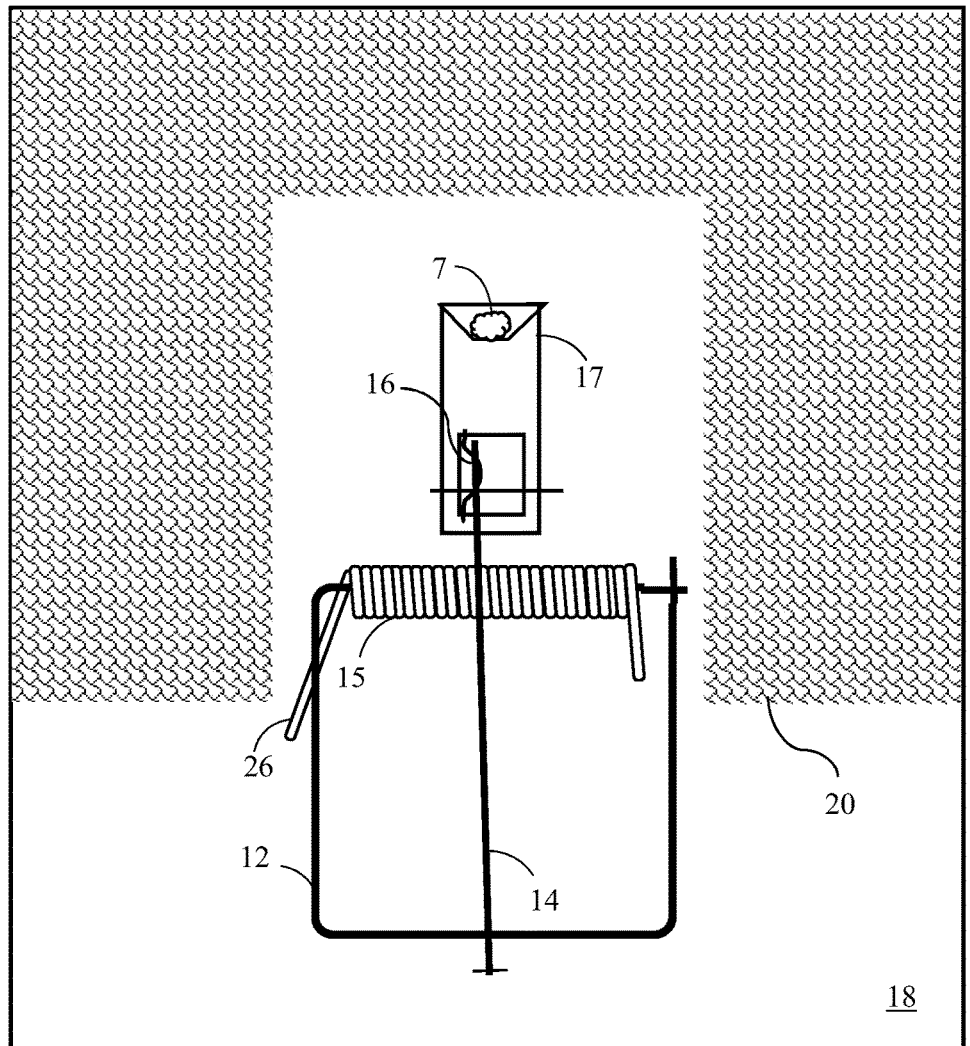
FIG. 2 is a top view of a first embodiment of the present invention in an armed configuration.
Figure 3:
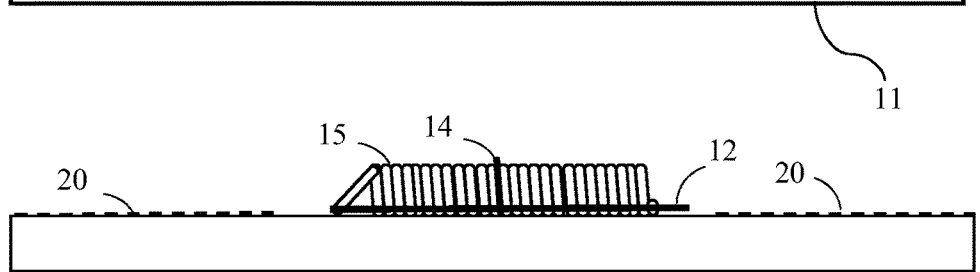
FIG. 3 is an end view of FIG. 2.
Figure 4:
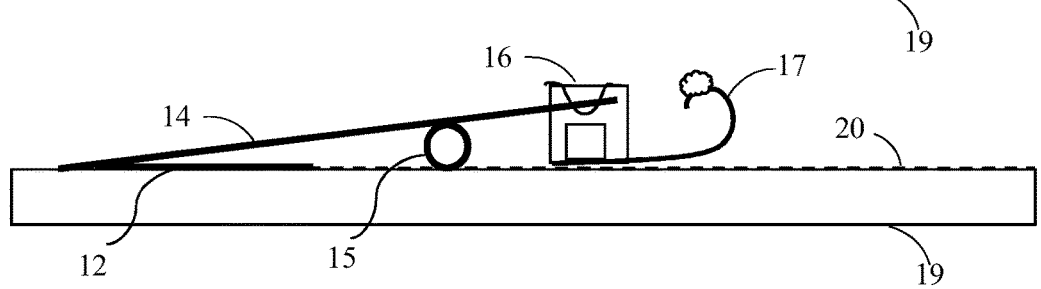
FIG. 4 is a side view of FIG. 2.
Figure 5:
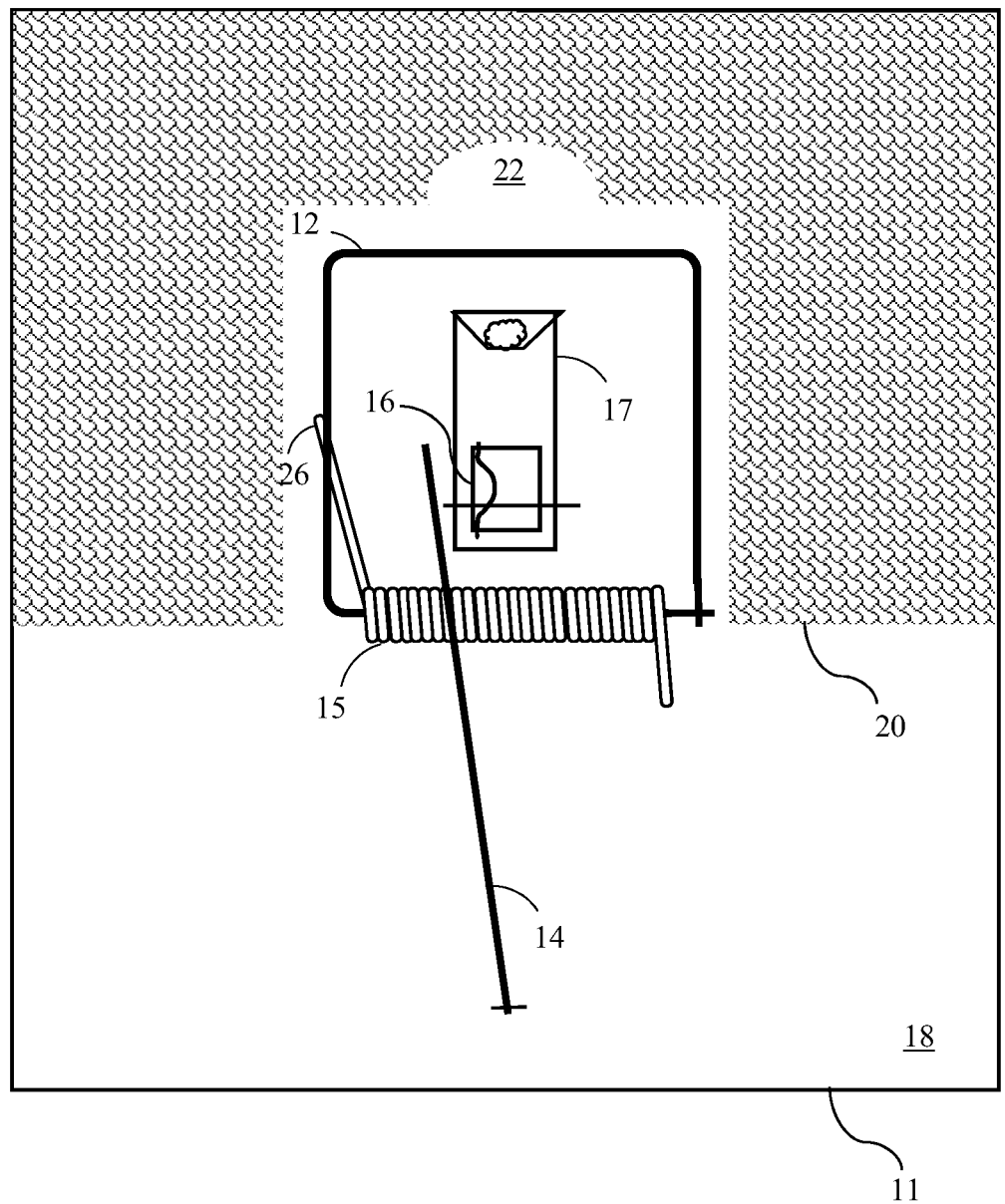
FIG. 5 shows a notch in a sticky area near the cross bar of FIG. 1.
Figure 6:
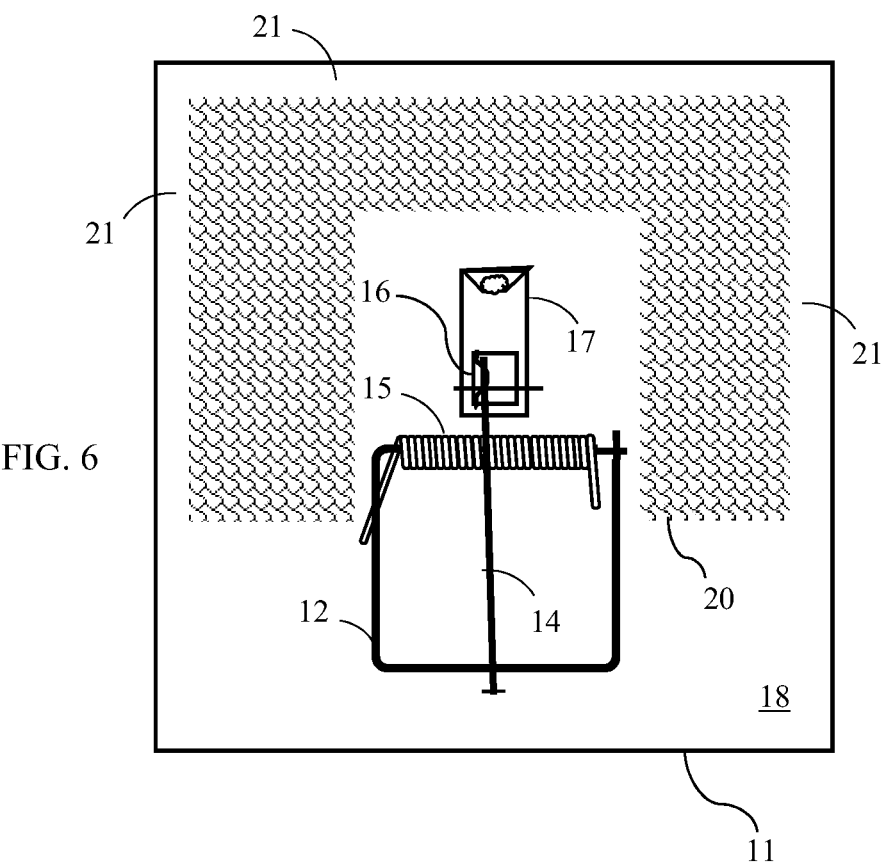
FIG. 6 shows a non-sticky area at the border of the base of FIG. 1.
Figure 8:
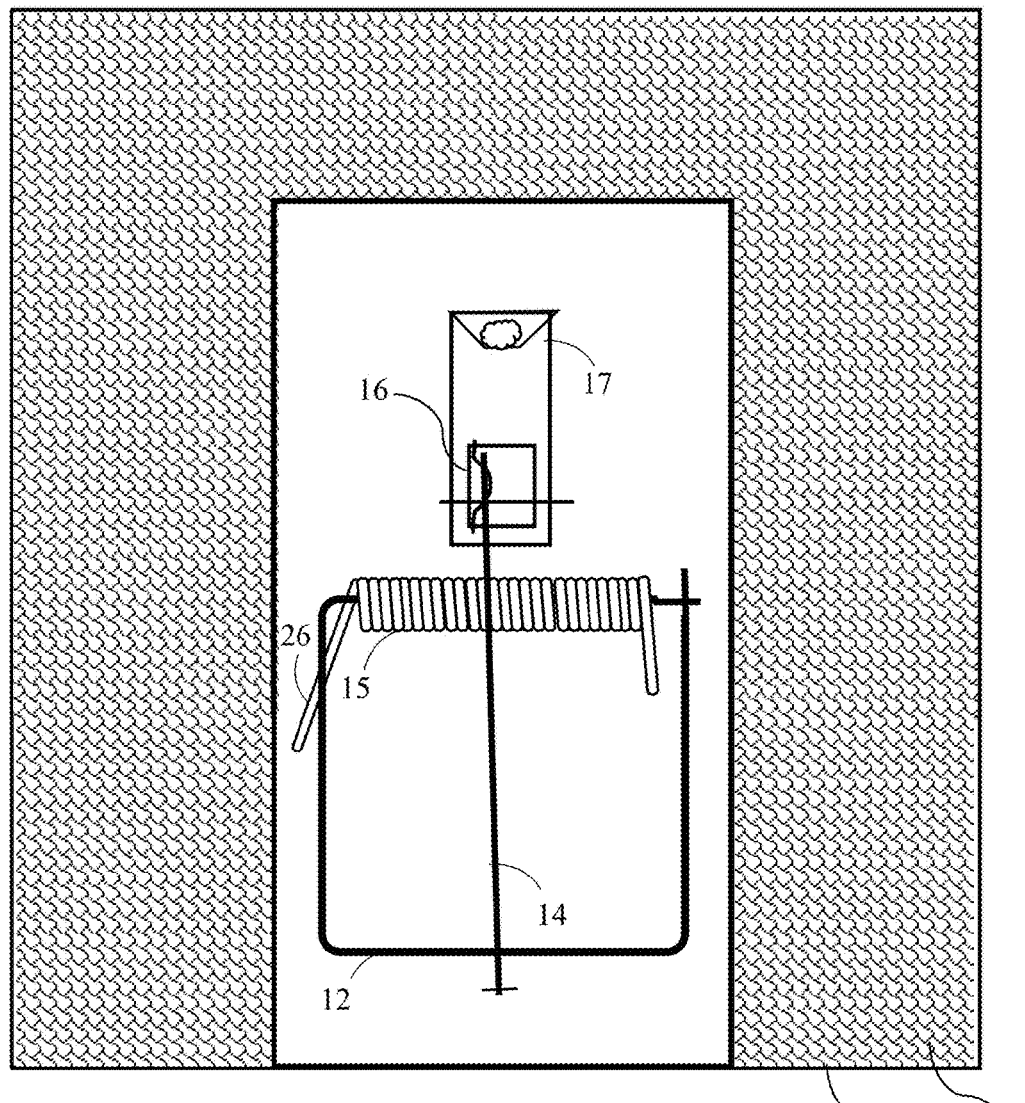
FIG. 8 is a top view of a second embodiment of the present invention in an armed configuration.
Figure 9:
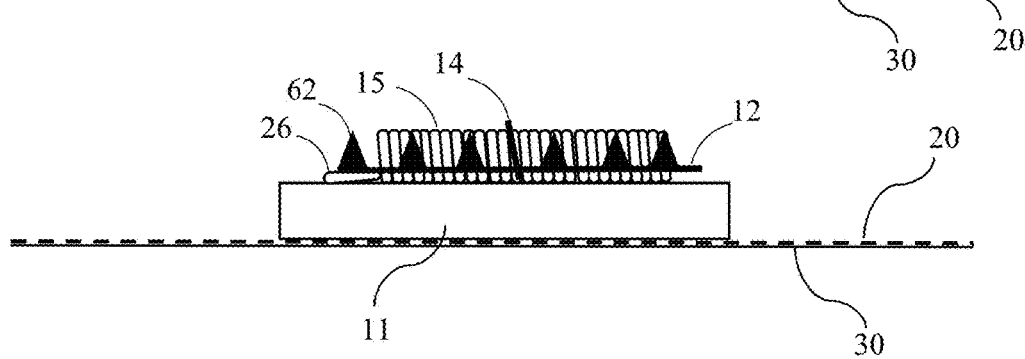
FIG. 9 is an end view of FIG. 8.
Figure 10:
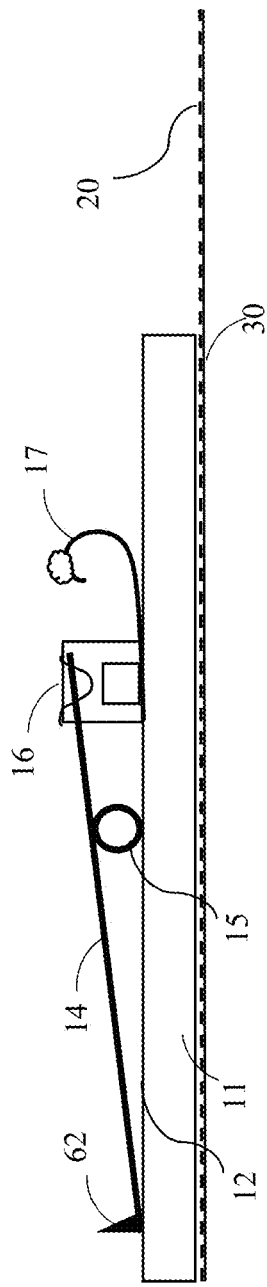
FIG. 10 is a side view of FIG. 8.
Figure 19:
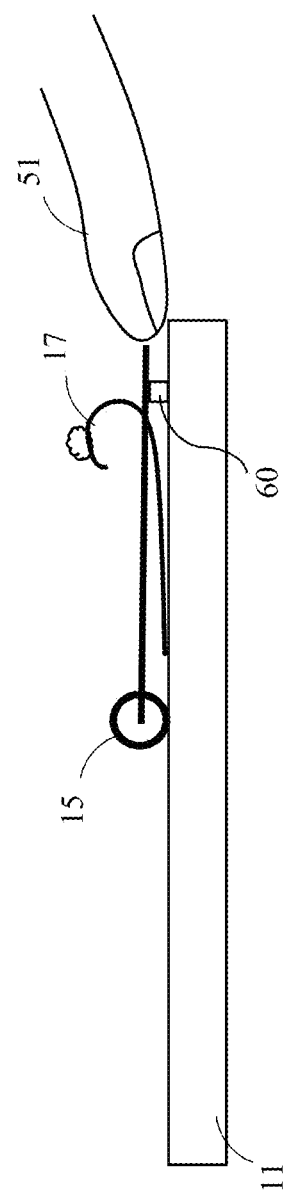
FIG. 19 is a side view of a base with a riser.
Figure 11:
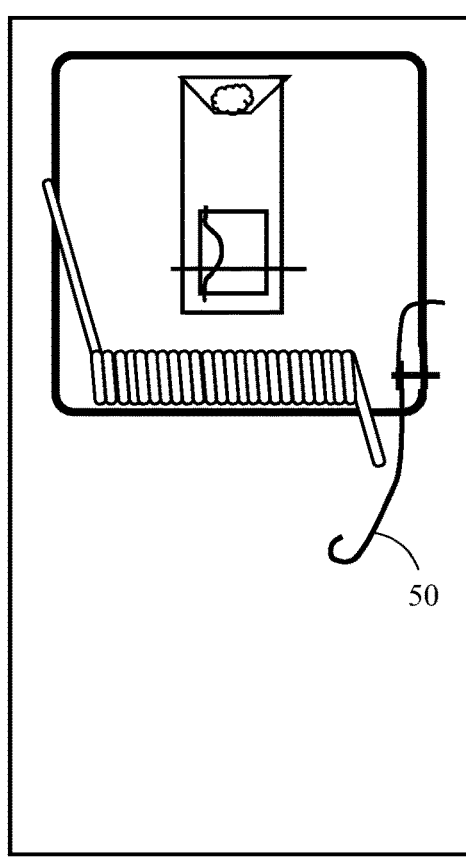
FIG. 11 is a top view of a base in an unarmed state showing a lift lever attached to the pivot arm.
Figures 12, 13:
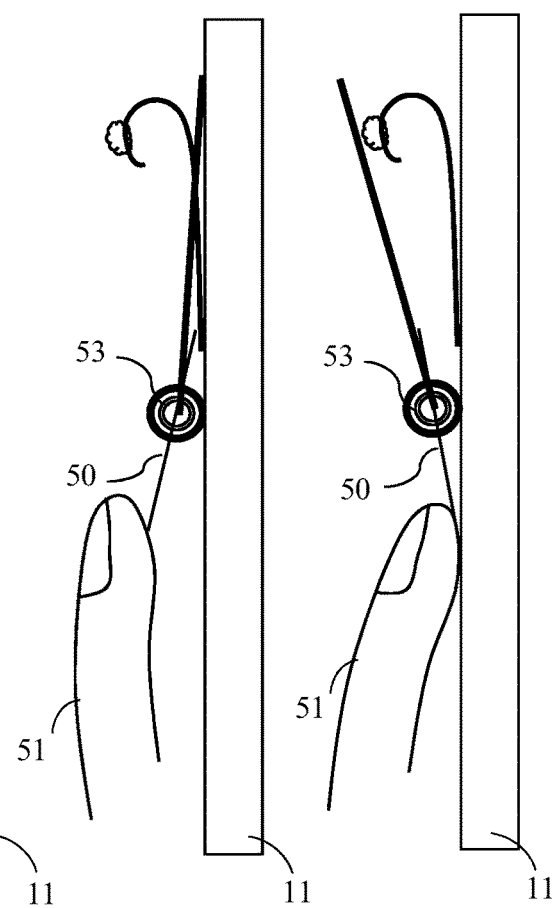
FIG. 12 is a side view of FIG. 11 with the lift lever in a rest position.
FIG. 13 is a side view of FIG. 11 with the lift lever depressed and thereby raising the hammer bar off the base.
Figure 14:
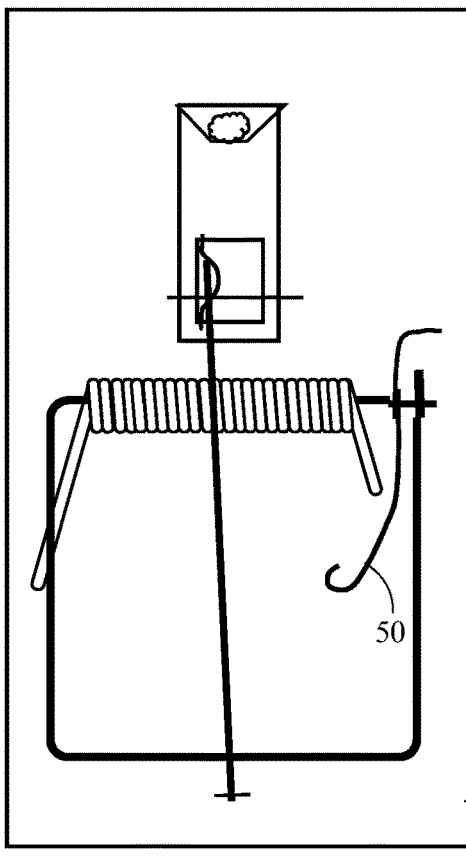
FIG. 14 is a top view of a base in an armed state showing a lift lever.

The base has a top surface 18 and a bottom surface 19. The sticky area 20 can be on the top surface 18, as shown in FIGS. 2-4, or on a sheet 30 below the top surface 18, as shown in FIGS. 8-10. For the latter configuration, the face surface of the sheet is sticky and preferably that face of the sheet 30 is attaches to the bottom surface 19 of the base 11. One way to achieve this arrangement is to place the base 11 on a glue trap, so that the glue trap surrounds the kill zone preferably on at least three sides of the kill zone. In a preferred embodiment, the top surface 18 of the base is not sticky inside the kill zone and has no adhesive inside the kill zone. However, other embodiments have a sticky area outside the kill zone and within it.

Figure 7:
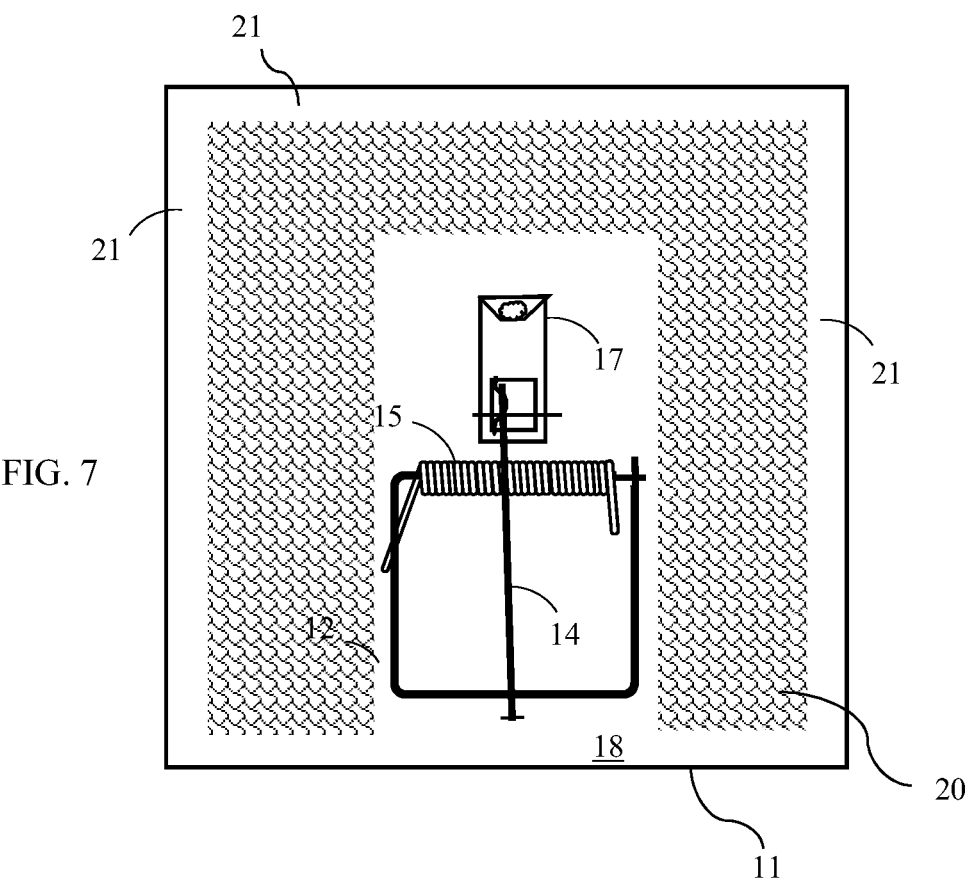
FIG. 7 shows a sticky area running the length of the base except for a non-sticky area at the border of the base of FIG. 1.

The sticky area 20 is strategically sized and located to allow the rodent to become detained in a location that still allows it to access the bait 7. The base 11 has a width W and a length L. See FIG. 1. The width Wk of the kill zone 40 is defined by the hammer bar. See FIGS. 1, 15-16. In embodiments in which the sticky area 20 is disposed on the top surface 18 of the base, the base 11 is necessarily wider than the kill zone 40. Typically the base 11 is at least twice the width of the kill zone 40 and may be much larger. In embodiments in which the sticky area 20 is below the top surface 18 of the base 11, the width of the base 11 is typically the same or only slightly larger than the kill zone 40 and the sheet 30 having the sticky face base 11 is at least twice the width of the kill zone 40 and may be much larger. The length of the sticky area 20 may vary, as shown by comparing the sticky area in FIGS. 1, 2, 5, 6, 7, 8. Typically the sticky area 20 has a length that is at least half the length of the base 11. That is, typically the sticky area 20 extends from at least the cross bar 42 to the past the spring 15. See FIG. 1. The sticky area 20 may extend the entire length of the base 11 as shown in FIG. 8 or nearly the entire length of the base 11 as shown in FIG. 7.

Figure 1:
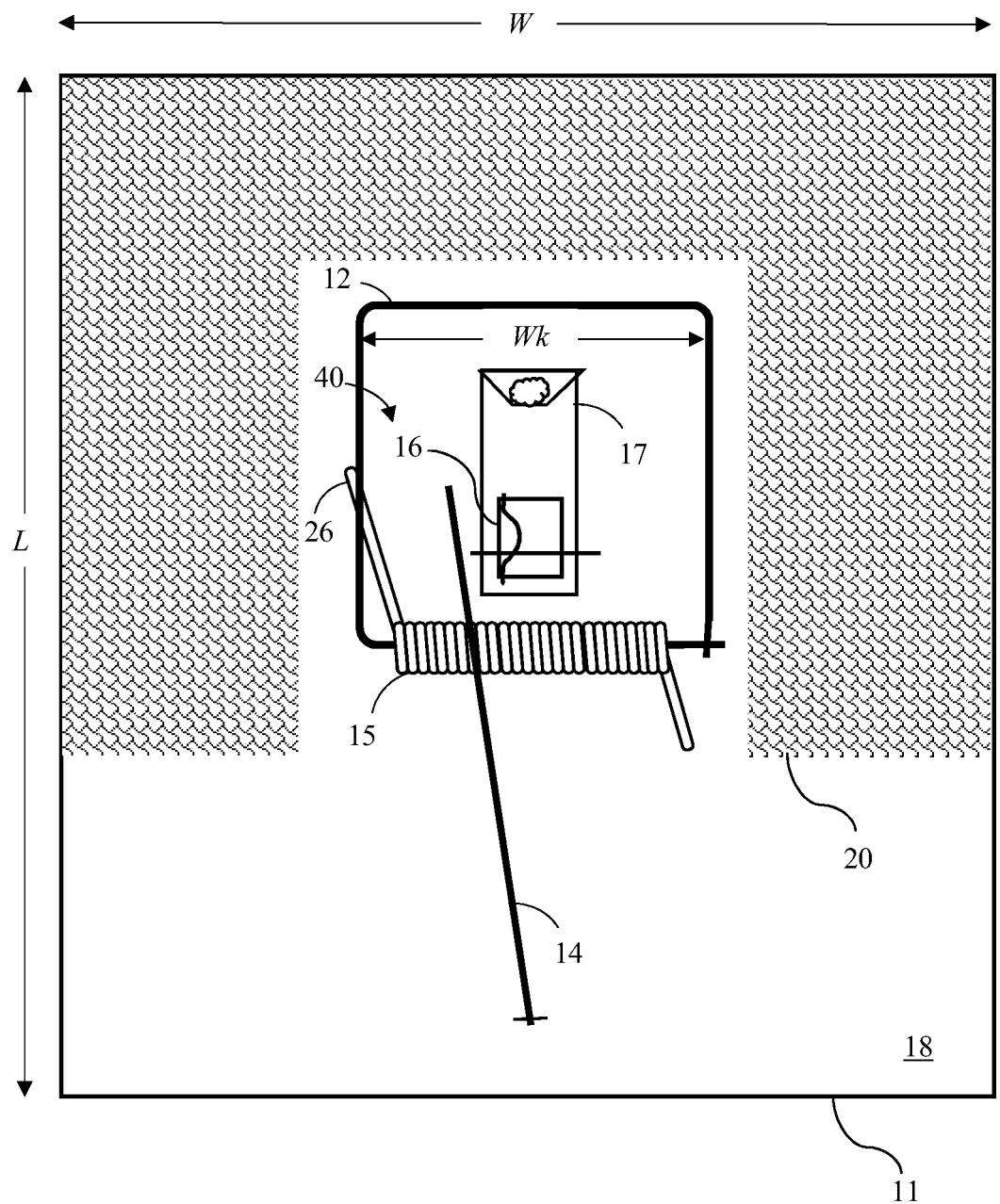
FIG. 1 is a top view of a first embodiment of the present invention in an unarmed configuration.

The sticky area 20 outside the kill zone 40 can be immediate adjacent to the kill zone 40 or separated from it by a non-sticky border 21. See. FIG. 1, for example. In some embodiments the non-sticky border 21 forms a notch of non-sticky area 22 near the cross bar 42 so that a person can pick up the hammer bar 12 to arm the device without sticking his fingers in the sticky area 20. See FIG. 5. In some embodiments the sticky area 20 extends to the edge of the base 11, as shown in FIGS. 1-5. In other embodiments the sticky area 20 does not extend to the edge of the base 11 and instead a non-sticky border 21 is left near the edge. See FIGS. 6-7. The non-sticky border 21 makes it easier to handle the trap without fingers getting stuck in the sticky area.

Figures 17, 18:
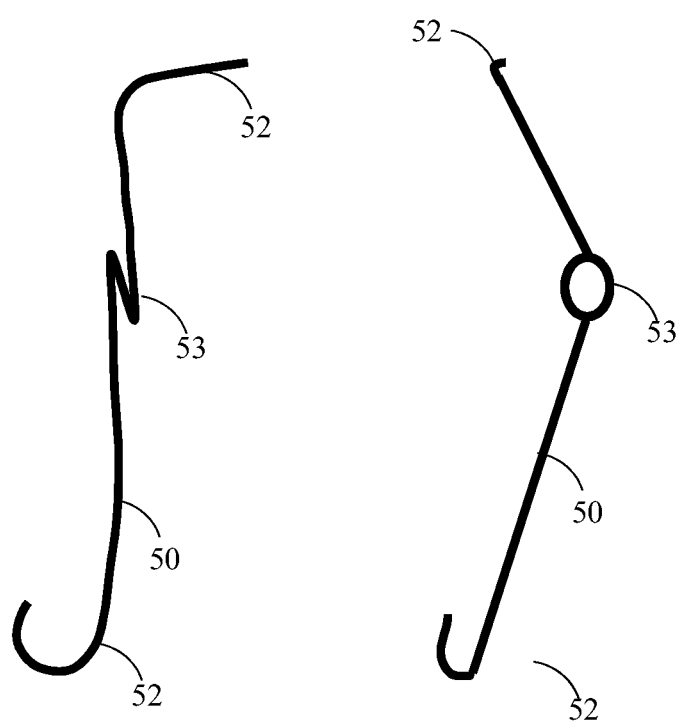
FIG. 17 is a top view of a lift lever.
FIG. 18 is a side view of the lift lever of FIG. 17.

In the trap's unarmed state, the hammer bar 12 rests on the base 11. Because the hammer bar 12 is typically a relatively thin wire it is difficult to pick up with bare fingers. To further improve the ease of arming the rodent trap, a lift lever 50 may be used to lift the hammer bar off the base 11 when in an unarmed state. See FIGS. 11-14. The lift lever 50 is made of a wire or other material stiff enough to lift the hammer bar 12 without bending. As shown in FIGS. 17-18, the lift lever 50 is bent at a first end 52 which rests under the first arm 41 or second arm 43 of the hammer bar 12 off the base 11. Between the first end 52 and the second end 54 of the lift lever 50 is an eye 53 that surrounds the pivot arm 44. The second end 54 may be straight or have a bend to provide more surface area for a finger 51 to press. When the trap is in its unarmed state, a user can press the second end 54 of the lift lever 50 down towards the base 11. The eye 53 acts as a fulcrum, thereby lifting the first end 52 and consequently the hammer bar 12. In some embodiments, the lift lever 50 is bent between the eye 53 and the second end 54 in such a way that the inflection point of the bend contacts the base 11 and acts as the fulcrum instead of the eye 53.

Another feature to make it easier to arm the rodent trap is a riser 60 or pair of risers attached to the base 11 to raise the hammer bar slightly off the base 11 when the trap is in its unarmed state. See FIG. 19. The riser 60 supports the hammer bar 12 off the top surface 18 of the base so that a user can more easily grab the hammer bar with his fingers. It also helps prevent the hammer bar 12 from contacting the adhesive that surrounds the hammer bar.

The trap can be used to kill any type of rodent and is sized appropriately to kill the desired rodent. To trap larger rodents the size of the trap is often larger than the size of the trap to kills smaller rodents.

The innovative aspects of the present invention may be applied to traps in which the hammer bar is shaped with sharp teeth 62 instead of a smooth wire, known as jaw traps. On some jaw traps, in lieu of a solid platform for a base, the trap has a base with teeth that mate with the hammer bar. The embodiment shown in FIGS. 8-10 is particularly suited to jaw traps.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. A rodent trap having an armed state and an unarmed state, the rodent trap comprising:
   a) a base having a top surface and a bottom surface;
   b) a hammer bar having a first arm, a cross bar, a second arm and a pivot arm, wherein the first arm, the cross bar, the second arm and the pivot arm define a kill zone therewithin on the top surface of the base when the rodent trap is in the unarmed state;
   c) a spring;
   d) a hold-down bar that biases the spring and hammer bar in the armed state;
   e) a bait pedal in the kill zone; and
   f) a sticky area outside the kill zone and on at least three sides of the kill zone wherein the sticky area is accessible to a rodent on the at least three sides of the kill zone while the rodent trap is in the armed state and wherein the kill zone is not sticky.

2. The rodent trap of claim 1 wherein the sticky area is on the top surface of the base.

3. The rodent trap of claim 2 wherein the sticky area is adjacent to the kill zone.

4. The rodent trap of claim 2 wherein the sticky area is separated from the kill zone by a non-sticky area.

5. The rodent trap of claim 2 wherein the sticky area extends to the edge of the base.

6. The rodent trap of claim 2 wherein the sticky area has a finger notch that exposes the base adjacent to the cross bar when the trap is in the unarmed state.

7. The rodent trap of claim 2 wherein at least a portion of the sticky area does not extend to the edge of the base.

8. The rodent trap of claim 1 wherein the spring is coiled around the pivot arm.

9. The rodent trap of claim 1 further comprising a lift lever connected to the pivot arm.

10. The rodent trap of claim 1 further comprising a riser in contact with the hammer bar when the trap is in the unarmed state.

11. The rodent trap of claim 1 further comprising a sheet attached to the bottom surface of the base wherein a face surface of the sheet is sticky.

12. A rodent trap having an armed state and an unarmed state, the rodent trap comprising:
   a) a base having a top surface and a bottom surface;
   b) a hammer bar having a first arm, a cross bar, a second arm and a pivot arm, wherein the first arm, the cross bar, the second arm and the pivot arm define a kill zone therewithin on the top surface of the base when the rodent trap is in an unarmed state;
   c) a spring;
   d) a bait pedal in the kill zone;
   e) a hold-down bar that biases the spring and hammer bar in the armed state; and
   f) a sheet having a sticky face, the sticky sheet attached at the sticky face to the bottom surface of the base wherein the sticky face is outside the kill zone and accessible to a rodent on at least three sides of the kill zone while the rodent trap is in the armed state and wherein the kill zone is not sticky.

13. The rodent trap of claim 12 wherein the hammer bar has teeth.

14. A rodent trap having an armed state and an unarmed state, the rodent trap comprising:
   a) a base having a top surface and a bottom surface;
   b) a hammer bar having a first arm, a cross bar, a second arm and a pivot arm, wherein the first arm, the cross bar, the second arm and the pivot arm define a kill zone therewithin on the top surface of the base when the rodent trap is in an unarmed state;
   c) a spring;
   d) a hold-down bar that biases the spring and hammer bar in the armed state;
   e) a bait pedal in the kill zone;
   f) a sticky area outside the kill zone and on at least three sides of the kill zone wherein the sticky area is accessible to a rodent on the at least three sides of the kill zone while the rodent trap is in the armed state and wherein the kill zone is not sticky; and
   g) a lift lever disposed on the pivot arm.

15. The rodent trap of claim 14 wherein the lift lever comprises a wire having an eye, wherein the eye is disposed around the pivot arm.

16. The rodent trap of claim 15 wherein the lift lever further comprises a first end configured to contact the hammer bar when the trap is in the unarmed state.

* * * * *